United States Patent [19]
Doi et al.

[11] Patent Number: 5,805,103
[45] Date of Patent: Sep. 8, 1998

[54] METHOD OF AND SYSTEM FOR MONITORING PRECEDING VEHICLES

[75] Inventors: Ayumu Doi; Hiroki Uemura; Yasunori Yamamoto; Tomohiko Adachi; Tohru Yoshioka, all of Hiroshima, Japan

[73] Assignee: Mazda Motor Corporation, Hiroshima, Japan

[21] Appl. No.: 718,908

[22] Filed: Sep. 24, 1996

[30] Foreign Application Priority Data

Sep. 27, 1995 [JP] Japan ................................. 7-249569

[51] Int. Cl.$^6$ .................................................. G01S 13/93
[52] U.S. Cl. .............................. 342/70; 342/72; 342/71; 340/903; 340/435
[58] Field of Search ................... 342/70, 71, 72; 340/903, 435, 436

[56] References Cited

U.S. PATENT DOCUMENTS

| | | | |
|---|---|---|---|
| 3,725,921 | 4/1973 | Weidman et al. | 342/71 |
| 4,073,359 | 2/1978 | Fujiki et al. | 342/71 |
| 4,148,028 | 4/1979 | Fujiki | 342/70 |
| 4,158,841 | 6/1979 | Wüchner et al. | 342/70 |
| 4,168,499 | 9/1979 | Matsumura et al. | 342/70 |
| 4,628,317 | 12/1986 | Nishikawa et al. | 340/903 |
| 4,916,450 | 4/1990 | Davis | 342/71 |
| 5,165,497 | 11/1992 | Chi | 180/169 |
| 5,467,072 | 11/1995 | Michael | 340/436 |
| 5,471,215 | 11/1995 | Fukuhara et al. | 342/70 |
| 5,493,302 | 2/1996 | Woll et al. | 342/70 |

FOREIGN PATENT DOCUMENTS 61-146644  4/1986  Japan .

*Primary Examiner*—John B. Sotomayor
*Attorney, Agent, or Firm*—Sixbey, Friedman, Leedom & Ferguson, Jr.; Donald R. Studebaker

[57] ABSTRACT

A distance monitoring system of a vehicle monitors a distance to a preceding vehicle traveling directly ahead of the vehicle to determines whether the preceding vehicle is decelerating by comparing a change in the vehicle speed with a reference value which is varied according to various driving condition in relation in particular to dangers such as collisions against the preceding vehicle.

25 Claims, 14 Drawing Sheets

METHOD OF AND SYSTEM FOR MONITORING PRECEDING VEHICLES

BACKGROUND OF THE INVENTION

1. Field of the Invention

The invention relates to a method of and system for monitoring a preceding vehicle traveling directly ahead of the vehicle equipped with the monitoring system and, more particular, a method of and system for quickly and accurately monitoring driving conditions, such as decelerating driving, accelerating driving and cruise driving, of a preceding vehicle traveling ahead of the vehicle equipped with the monitoring system.

2. Description of Related Art

An increasing number of automobiles are being equipped with cruise control systems for automatically driving a car at a constant speed and, in recent years, the automotive field is beginning to see the appearance of distance-monitoring cruise control systems capable of automatically controlling the speed of the vehicle while simultaneously monitoring the distance to a preceding vehicle traveling ahead of the vehicle.

It is desirable that such a distance-monitoring cruise control system be capable of monitoring sudden deceleration of a preceding vehicle directly ahead of the vehicle. That is, because there are many cases in which it is unsafe or undesirable to operate continuously the cruise control when the preceding vehicle is decelerating, there is a necessity to disable operation of the cruise control and/or alert the driver of the vehicle to the deceleration of the preceding vehicle. It is further desirable, even while the vehicle is traveling in a normal driving mode where the cruise control is not utilized, to monitor the distance of the vehicle to a preceding vehicle in order to prevent the vehicle from being drawn dangerously near the preceding vehicle.

One of approaches to detecting deceleration of a preceding vehicle ahead of the vehicle as quickly and accurately as possible is that taught by Japanese Unexamined Patent Publication No. 61-146644. A system described in the publication detects a relative speed between the two vehicles based on a distance to a preceding vehicle ahead of the vehicle from which the deceleration of the preceding vehicle is judged.

Generally, the relative speed between two vehicles traveling on a road in the same direction is always changing. In cases where deceleration of a preceding vehicle ahead of a vehicle is judged based either directly on the relative speed between the two vehicles, or on a threshold value for the judgement of deceleration of the preceding vehicle which is determined based on the relative speed, there is a necessity to establish the threshold value so as to facilitate quick detection of deceleration of the preceding vehicle as easily as possible. In such a case, there is a possibility of failure in detection of deceleration of the preceding vehicle even while the preceding vehicle is cruising. Conversely, there is also a problem in that the judgement of deceleration of the preceding vehicle will be delayed in order to prevent the failure in detection of deceleration of the preceding vehicle.

SUMMARY OF THE INVENTION

It is an object of the invention to provide a method of and a system for quickly and accurately determining deceleration of a preceding vehicle traveling ahead of the vehicle equipped with the preceding vehicle monitoring system.

According to the invention, there are employed two conditions for determination of deceleration of a preceding vehicle ahead of a vehicle equipped with the preceding vehicle monitoring system (which is hereafter referred to as a system-equipped vehicle 1). One of the conditions is that a change in a distance from the system-equipped vehicle 1 to a preceding vehicle ahead of the system-equipped vehicle 1 (which is hereafter referred to as an inter-vehicle distance) measured at regular intervals is decreasing during a specific number of continual measurements. Another condition is that the inter-vehicle distance is reducing at a rate greater than a specific reference value in a period of time for a specific number of continual measurements when the first condition is satisfied. Deceleration of the preceding vehicle is definitely determined as a result of satisfying both two conditions.

The specific reference value or threshold value is altered according to safety or dangerous situations of the system-equipped vehicle 1 to preceding vehicles.

With the preceding vehicle monitoring method and system of the invention, deceleration of a preceding vehicle is provisionally ascertained by monitoring whether a specified number of continuous measurements of a reduction in inter-vehicle distance to the preceding vehicle has occurred. Thereafter, it is definitely ascertained by monitoring whether a changing rate at which the system-equipped vehicle 1 reduces the inter-vehicle distance for a period of time for the specified number of continuous measurements has exceeded a specified rate. By means of the double ascertainment, the verification that the system-equipped vehicle 1 is driven by necessity of control for avoiding a danger of a collision against the preceding vehicle is enabled quickly and accurately.

The specific reference value is optimized according to various parameters established in relation to driving situations. For example, the driving situations include relative driving conditions, such as an inter-vehicle distance between a system-equipped vehicle 1 and a preceding vehicle ahead of the system-equipped vehicle 1, a relative speed between the two vehicles, and a speed of the system-equipped vehicle 1, and driving circumstances, such as traffic congestion or crowdedness of a road on which the system-equipped vehicle 1 is travelling, a slope angle of a downgrade on which the system-equipped vehicle 1 is travelling, visibility of the forward visual field of the system-equipped vehicle 1, a safety margin against dangers to the previous vehicle vehicles, inroads of vehicles into a line between the system-equipped vehicle 1 and the preceding vehicle, and ambient brightness of surroundings of the system-equipped vehicle 1.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE SPECIFIC EMBODIMENTS

Figure 1:
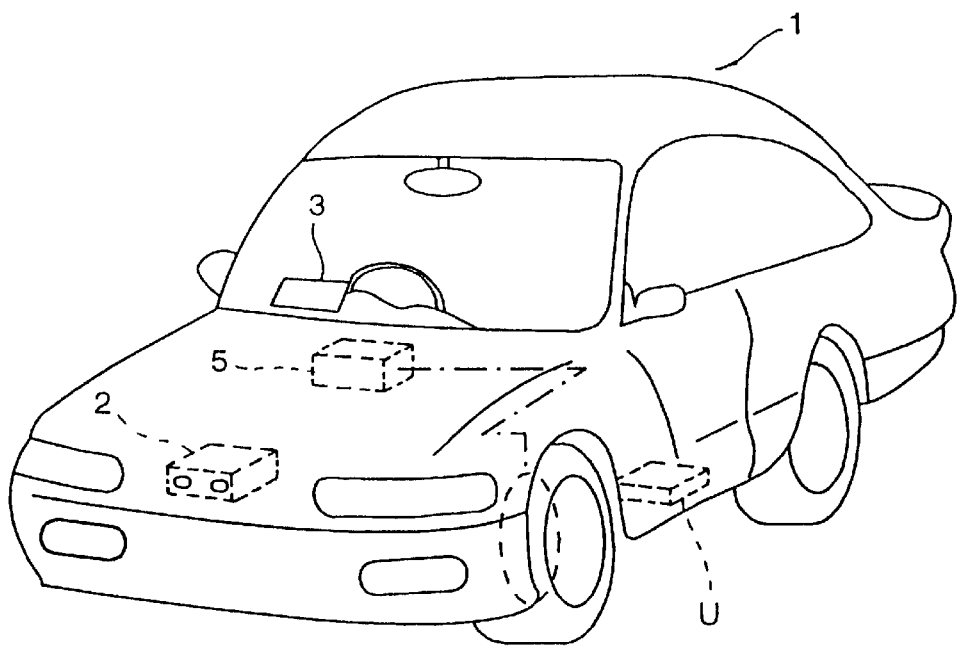
FIG. 1 is a schematic illustration of a vehicle equipped with a preceding vehicle monitoring system in accordance with an embodiment of the invention.

Referring to the drawings in detail, in particular, to FIG. 1, a vehicle 1 is equipped with a radar 2 such as an ultrasonic radar or a laser radar 2 for monitoring an inter-vehicle distance of the system-equipped vehicle 1 to the preceding vehicle. Radar 2 includes a radar transmitter and a radar receiver. The radar transmitter emits radar waves toward the preceding vehicle at specific time intervals, and the elapsed time taken for the waves to return to the radar receiver from the preceding vehicle is measured in order to detect the inter-vehicle distance to the preceding vehicle. The system-equipped vehicle 1 is equipped with an indicator panel 3 for indicating various signs on an instrument panel.

Figure 2:
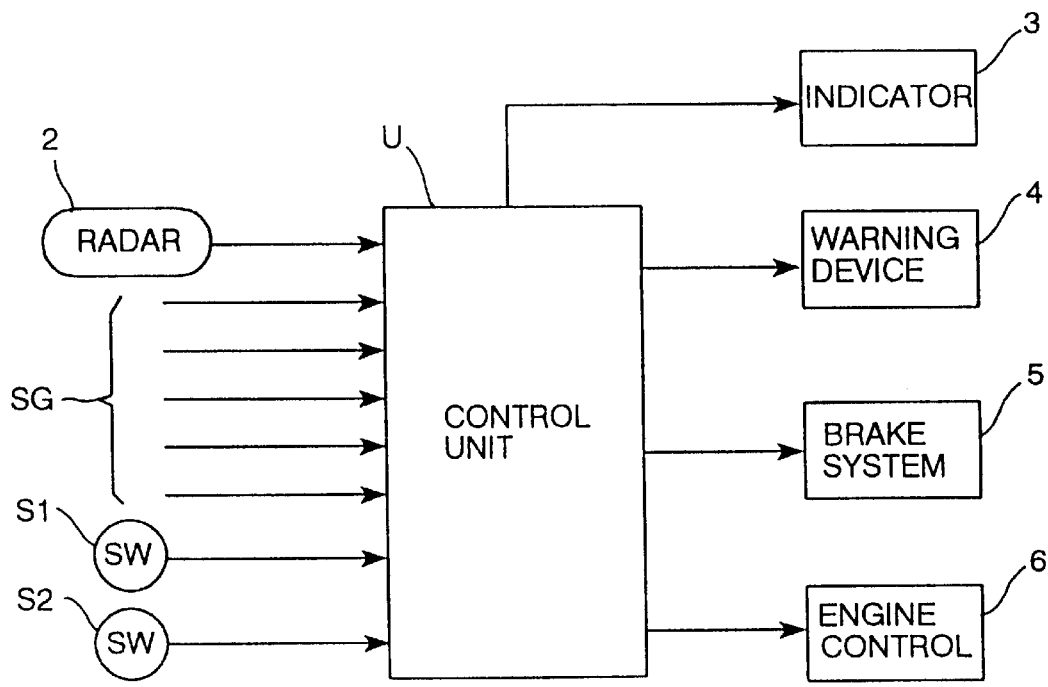
FIG. 2 is a block diagram of a control unit of the preceding vehicle monitoring system.

Control unit U comprising a microcomputer is also installed to the system-equipped vehicle 1, and has the purpose of determining deceleration of the preceding vehicle. As shown in FIG. 2, in addition to receiving signals from the radar 2, the control unit U receives signals from various sensors including a speed sensor S1 for monitoring the speed of vehicle 1, a driver-operated manual switch S2 for activating the distance-monitoring cruise control system is activated and a group of sensors depicted in the figure as SG which are used to provide various signals necessary for control which will be explained subsequently. Furthermore, the control unit U outputs signals to a warning device 4, and an automatic braking system 5.

As is subsequently explained, the warning device 4 and automatic braking system 5 are activated when it is determined that the preceding vehicle is decelerating. The warning device 4 emits, preferably sound, or alternatively light, in order to warn the driver of deceleration of the preceding vehicle. The system-equipped vehicle 1 may be equipped with either the warning device 4 or the automatic braking system 5 and may be equipped with means of forcefully stopping the system-equipped vehicle 1 by, for example, reducing engine power or shifting the transmission to a lower gear in place of applying the automatic braking system 5. The control unit U incorporates a conventional cruise control function and is, consequently, capable of controlling an engine output control means 6, which may take the form of an actuator for adjusting engine throttle position in the case of, in particular, gasoline engines, and a fuel injection valve in the case of, in particular, diesel engines.

Figure 3:
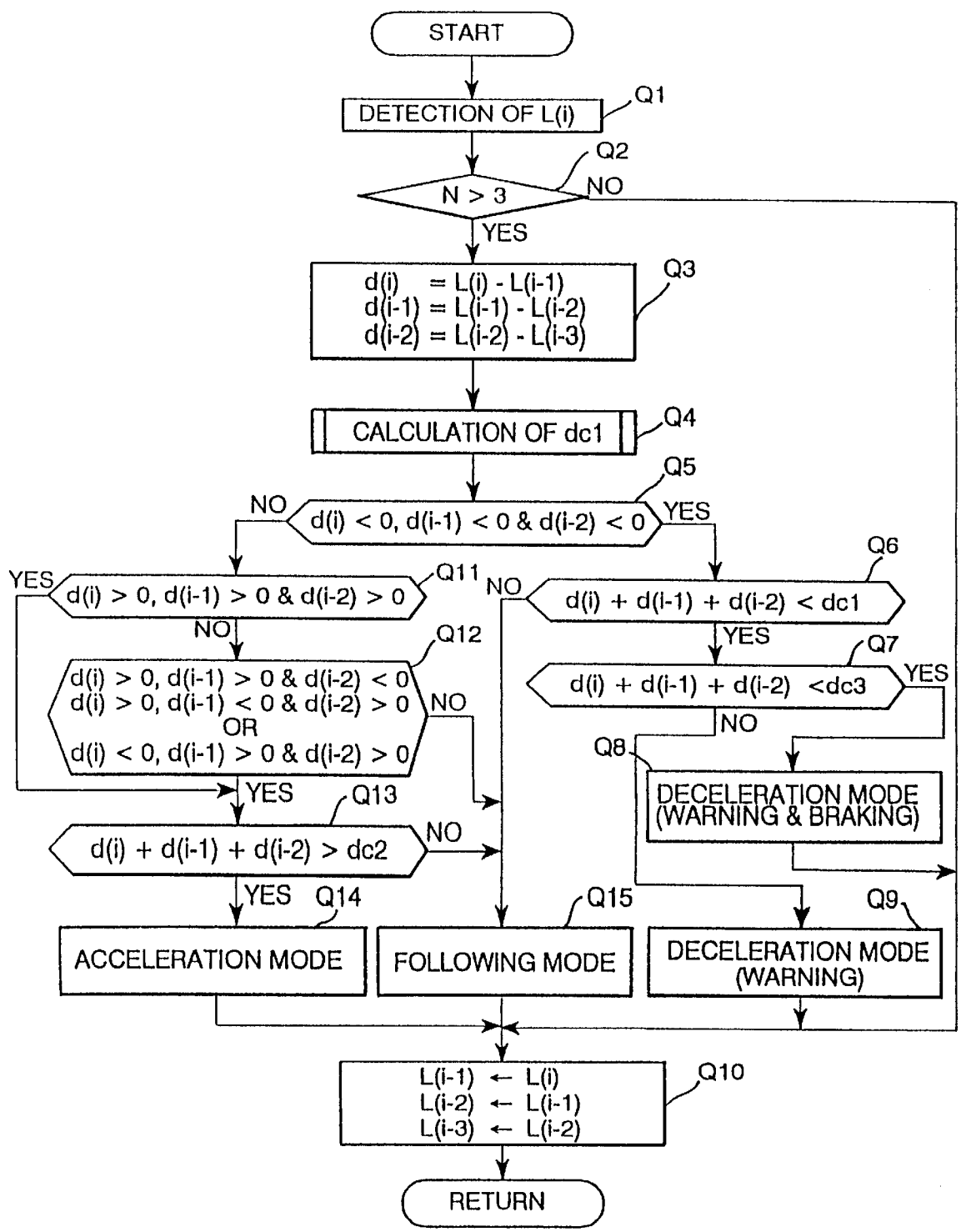
FIG. 3 is a flow chart illustrating a sequence routing of determining driving conditions of a preceding vehicle for the control unit.

FIG. 3 is a flow chart illustrating the sequential routine of determining the driving mode of the preceding vehicle, as executed for the microcomputer of the control unit U. In this embodiment, the control sequence routine of the determination of preceding vehicle deceleration shown in FIG. 3 is activated on condition in this embodiment that the distance-monitoring cruise control system is activated in response to operation of the driver-operated manual switch S2 shown in FIG. 2 and continuously operating. The control sequence routine of the determination of preceding vehicle deceleration may be, however, manually activated by the driver, independently of operation of the distance-monitoring cruise control system through the driver-operated manual switch S2.

The sequence logic commences and control passes directly to step Q1 where the latest inter-vehicle distance between the system-equipped vehicle 1 and the preceding vehicle and the preceding vehicle L(i) is calculated based on an output of the radar 2. In this instance, the suffix "i" in parenthesis indicates the latest sequence routine for measurement of inter-vehicle distance L(i). When it is judged at step Q2 that three previous inter-vehicle distance have been made, calculations are made at step Q3, to obtain distance variations d, namely the latest distance variation d(i) caused in the latest cycle by subtracting the previous inter-vehicle distance L(i-1) from the latest inter-vehicle distance L(i), the 1st previous vehicle distance variation d(i-1) in the 1st previous cycle by subtracting the 2nd previous inter-vehicle distance L(i-2) from the 1st previous inter-vehicle distance L(i-1), and the 2nd previous vehicle distance variation d(i-2) by subtracting the 3rd previous inter-vehicle distance L(i-3) from the 2nd previous inter-vehicle distance L(i-2). The specified number of times of measurement of distance variations may not be three but appropriately varied. At step Q4, a variable threshold level of variation dc1 is variably established to make a determination as to the existence of deceleration of the preceding vehicle which will be described late.

Subsequently, a determination is made at step Q5 as to whether or not all of the last three distance variations d(i), d(i-1) and d(i-2) are negative, that is, whether the relative distance has decreased in each of the three cycles. If the answer to the determination is affirmative, this indicates that the relative distance has been decreasing, then, a determination is made at step Q6 as to whether the total decrease of the last three distance variations is less than the variable threshold level of variation dc1. If the determination at step Q6 results in an affirmative decision, another determination is made at step Q7 as to whether the total decrease of the latest three distance variations is less than a fixed threshold level of variation dc3 for determination of quick deceleration of the preceding vehicle which is less than the variable threshold level of variation dc1. If the answer to the determination made at step Q7 is affirmative, this indicated that the preceding vehicle is traveling in a quick deceleration mode and the system-equipped vehicle 1 has approached too close to the preceding vehicle, then, the automatic braking system is activated while a warning is sent to the driver, following the judgement of a quick deceleration mode, at step Q8. Even if the answer to the determination made at step Q7 is negative, it is judged that the preceding vehicle is traveling in a deceleration mode at step Q9. In this case, a warning is sent to the driver following the judgement that the preceding vehicle is decelerating. After the judgement at step Q8 or Q9, the last three inter-vehicle distances L(i), L(i-1) and L(i-2) are substituted as the 1st, 2nd and 3rd previous distances L(i-1), L(i-2) and L(i-3), respectively, at step Q10, and stored in a random access memory (RAM) of control unit U. These updated 2nd and 3rd previous distances L(i-1) and L(i-2) are utilized to calculate the last three distance variations d(i), d(i-1) and d(i-2) at step Q3 in the following cycle. If the determination concerning the variable threshold level of variation dc1 made at step Q6 results in a negative answer, this indicates that there has been no significant decrease in the inter-vehicle distance, then, it is judged that the preceding vehicle is traveling in a following mode at step Q15. The following mode means that the preceding vehicle is cruising at a speed appropriate for the system-equipped vehicle 1 to follow.

If the answer to the determination made at step Q5 is negative, another determination is made at step Q11 as to whether or not all of the last three distance variations d(i), d(i-1) and d(i-2) are negative, that is, whether the relative distance has increased in each of the three cycles. If the answer to the determination is negative, a further determination is made at step Q12 as to whether two out of the last three distance variations are positive and the remaining one is negative. If the determination made at step Q11 or Q12 renders the answer affirmative, the sequence logic passes directly to step Q13 where a determination is made as to whether the total value of the last three distance variations in the latest cycles of the sequence routine is greater than a fixed threshold level of variation dc2 for determination of acceleration of the preceding vehicle which is greater than the variable threshold level of variation dc1. If the answer to the determination is affirmative, it is judged that the preceding vehicle is traveling in a acceleration mode at step Q14. On the other hand, if the answer to the determination made at step Q12 or Q13 is negative, it is judged that the preceding vehicle is traveling in the following mode at step Q15.

After the judgement of driving mode at step Q8, Q9, Q14 or Q15, the last three distances L(i), L(i-1) and L(i-2) are substituted as the 1st, 2nd and 3rd previous distances L(i-1), L(i-2) and L(i-3), respectively, at step Q10, and stored in a random access memory (RAM) of control unit U.

When it is determined that the preceding vehicle is in the acceleration mode, the indicator 3 indicates a sign representing that the preceding vehicle is in the acceleration mode. When it is determined that there has been no significant change in the inter-vehicle distance, no special control is executed because the system-equipped vehicle 1 is operating safely in the manner desired by the driver.

In the sequential routine of determining the driving mode of the preceding vehicle shown in FIG. 3, the function at step Q8 may be modified to make a determination of stop mode in place of the determination of quick deceleration mode.

Figure 4:
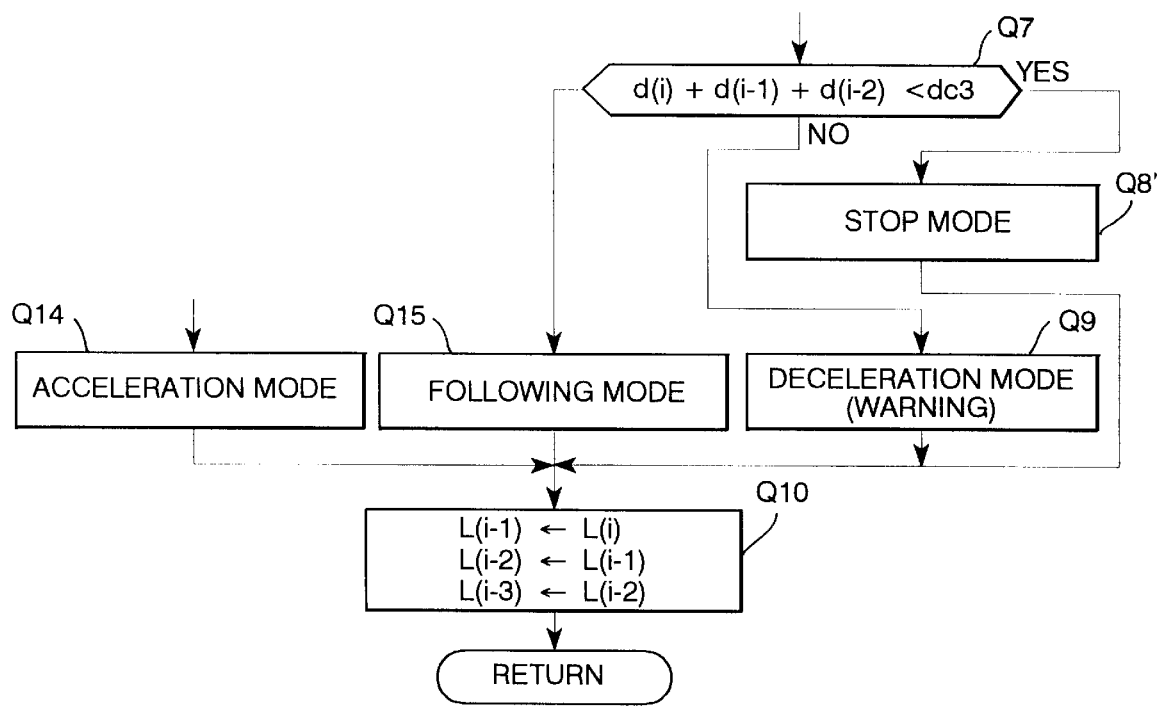
FIG. 4 is a flow chart illustrating a part of a modified sequence routing of determining driving conditions of a preceding vehicle for the control unit.

As shown in FIG. 4, when the answer to the determination made at step Q7 as to whether the total decrease of the last three inter-vehicle distance variations is less than the fixed threshold level of variation dc3 is affirmative, it is determined that the preceding vehicle is in a stop mode where the preceding vehicle is being brought to a quick halt or is stopping at step Q8'.

In the sequential routine of determining the driving mode of the preceding vehicle shown in FIG. 4, information of driving conditions of the preceding vehicle in any driving mode may be given to the driver of the system-equipped vehicle 1.

Figure 5:
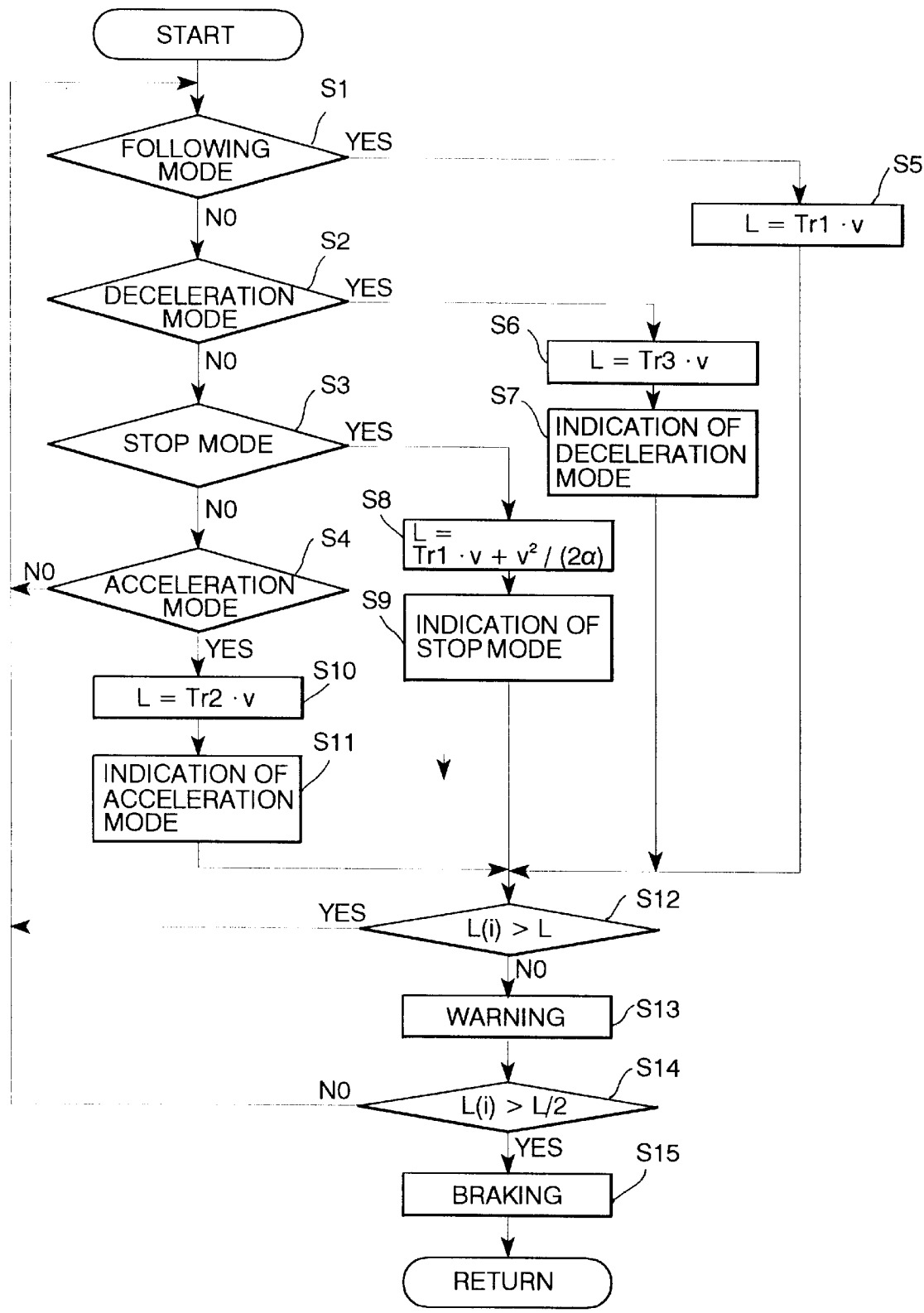
FIG. 5 is a flow chart illustrating a sequence routing of warning and automatic braking.
Figure 6:
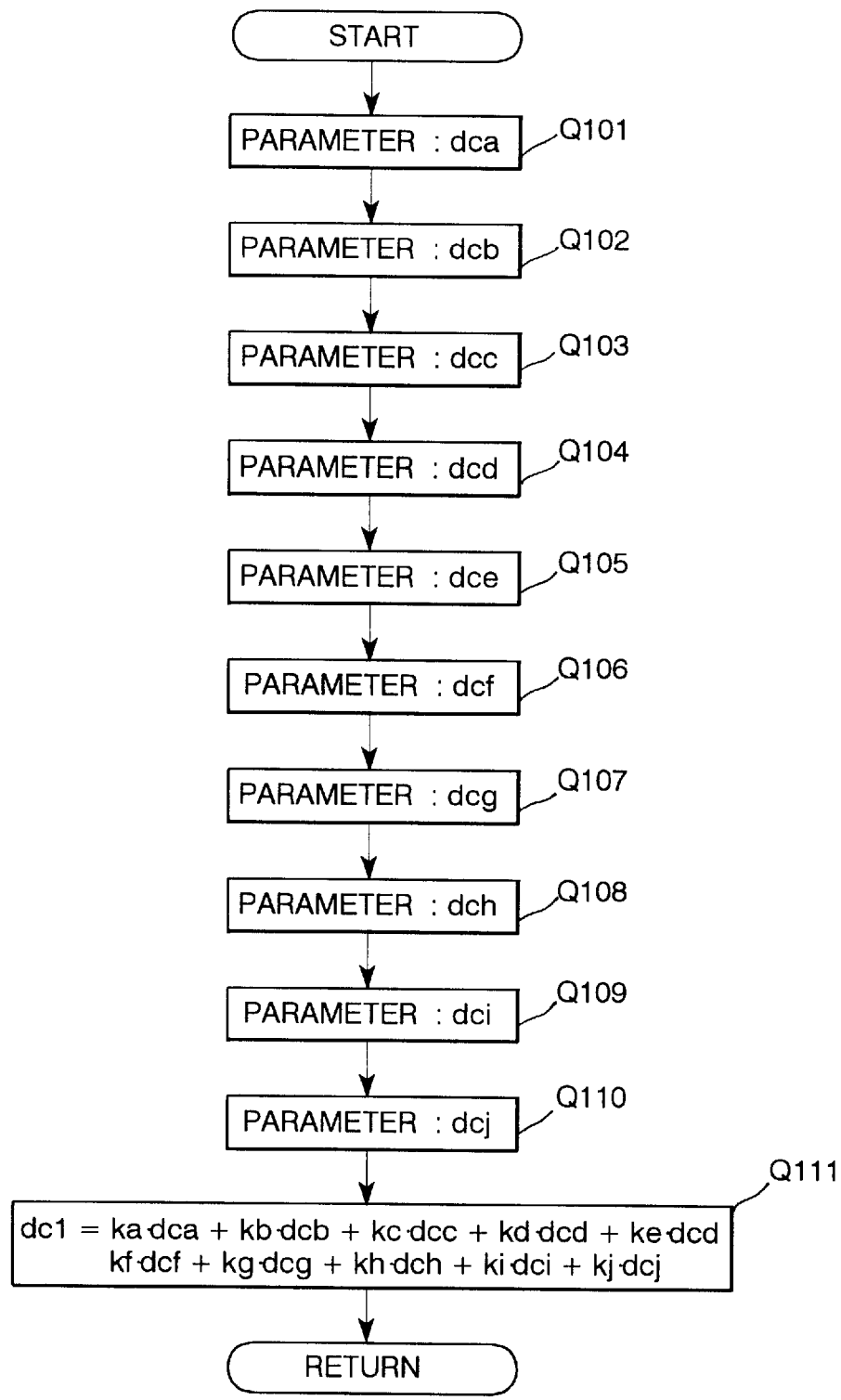
FIG. 6 is a flow chart illustrating a sequence routing of establishing a threshold value dc1 of variation for determining that a preceding vehicle is in a deceleration mode.

Referring to FIG. 5, which is a flow chart illustrating the sequential routine of providing information on driving conditions of the preceding vehicle for the microcomputer of the control unit U, when the preceding vehicle is determined to be in the following mode at step S1, a critical inter-vehicle distance L, which is the shortest safety inter-vehicle distance necessary for the system-equipped vehicle 1 to evade dangerous approach to the preceding vehicle, is established based on a vehicle speed v and a time Tr1 at step S2. This time Tr1 is established as a response time necessary for an average driver to step on a footbrake pedal after the driver perceives a danger. When it is determined at step S2 that the preceding vehicle is in the deceleration mode, while the critical inter-vehicle distance L is established based on a vehicle speed v, and a time Tr3 which is greater than the response time Tr1, at step S6, a sign is displayed on the indicator 3 to inform the driver that the preceding vehicle is in the deceleration mode at step S7. When it is determined at step S3 that the preceding vehicle is in the stop mode, while the critical inter-vehicle distance L is established based on a vehicle speed v, an acceleration rate a, and the response time Tr1, at step S8, a sign is displayed on the indicator 3 to inform the driver that the preceding vehicle is in the stop mode at step S9. Further, when it is determined at step S4 that the preceding vehicle is in the acceleration mode, while the critical inter-vehicle distance L is established based on a vehicle speed v, and a time Tr2 which is smaller than the response time Tr1, at step S10, a sign is displayed on the indicator 3 to inform the driver that the preceding vehicle is in the stop mode, at step S11.

Subsequently to having established the critical inter-vehicle distance, a determination is made at step S12 as to whether the inter-vehicle distance L(i) is greater than the critical inter-vehicle distance L. When the inter-vehicle distance L(i) is greater than the critical inter-vehicle distance L, another determination concerning the driving mode is made at steps S1 through S4. If the inter-vehicle distance L(i) is less than the critical inter-vehicle distance L, this indicates that the system-equipped vehicle 1 is approaching the preceding vehicle exceeding the critical inter-vehicle distance L, then, while a warning is sent to the driver at step S13, a determination is made at step S14 as to whether the inter-vehicle distance L(i) is less than a half of the critical inter-vehicle distance L in order to judge whether the system-equipped vehicle 1 possibly encounters a rear-end collision against the preceding vehicle. When the inter-vehicle distance L(i) is greater than the half of the critical inter-vehicle distance L, another determination concerning the driving mode is made at steps S1 through S4. On the other hand, when the system-equipped vehicle 1 has approached too close to the preceding vehicle, then, the automatic braking system is activated to slow down the vehicle or bring the system-equipped vehicle 1 to a halt at step S15. In this way, the driver is always informed of a driving mode of the previous vehicle.

FIG. 4 is a flow chart illustrating the variable threshold level of variation dc1 setting subroutine, called for at step Q4 of the driving mode determining sequence routine, which is activated on condition in this embodiment that the distance-monitoring cruise control system is activated in response to operation of the driver-operated manual switch S2 shown in FIG. 2 and continuously operating.

The variable threshold level of variation dc1 is established based on various threshold values or parameters established at steps Q101 through Q110. As will be described more specifically later, the utilization is made of a distance parameter dca in relation to the inter-vehicle distance to the preceding vehicle established at step Q101, a relative speed parameter dcb in relation to the relative speed between the two vehicles established at step Q102, a vehicle speed parameter dcc in relation to the speed of the system-equipped vehicle 1 established at step Q103, a traffic congestion parameter dcd in relation to traffic congestion or crowdedness of a road established at step Q104, a slope parameter dce in relation to a downgrade slope angle established at step Q105, a visibility parameter dcf in relation to visibility established at step Q106, a safety margin parameter dcg in relation to a safety margin to encounter a dangerous condition with respect to the previous vehicle established at step Q107, an inroad parameter dch in relation to vehicles making inroads in front of the system-equipped vehicle 1 established at step Q108, a brightness parameter dci in relation to the ambient brightness of surroundings established at step Q109, and a tunnel parameter dcj in relation to driving through a tunnel established at step Q110. More specific explanations relating to the determination of the parameters dca through dcj will follow.

Following the determination of the parameters dca through dcj, the variable threshold level of variation dc1 is calculated by adding the weighted parameters dca through dcj together at step Q11. The parameters dca through dcj are weighted through the application of coefficients ka through kj, respectively. Values of these weighing coefficients ka through kj are each established as greater than 0 (zero) but less than 1 (one) with their total value equaling 1 (ka+kb+kc+kd+ke+kf+kg=1). It is a matter of course that the influence of each weighing coefficient will increase as its value increases.

Figure 7:
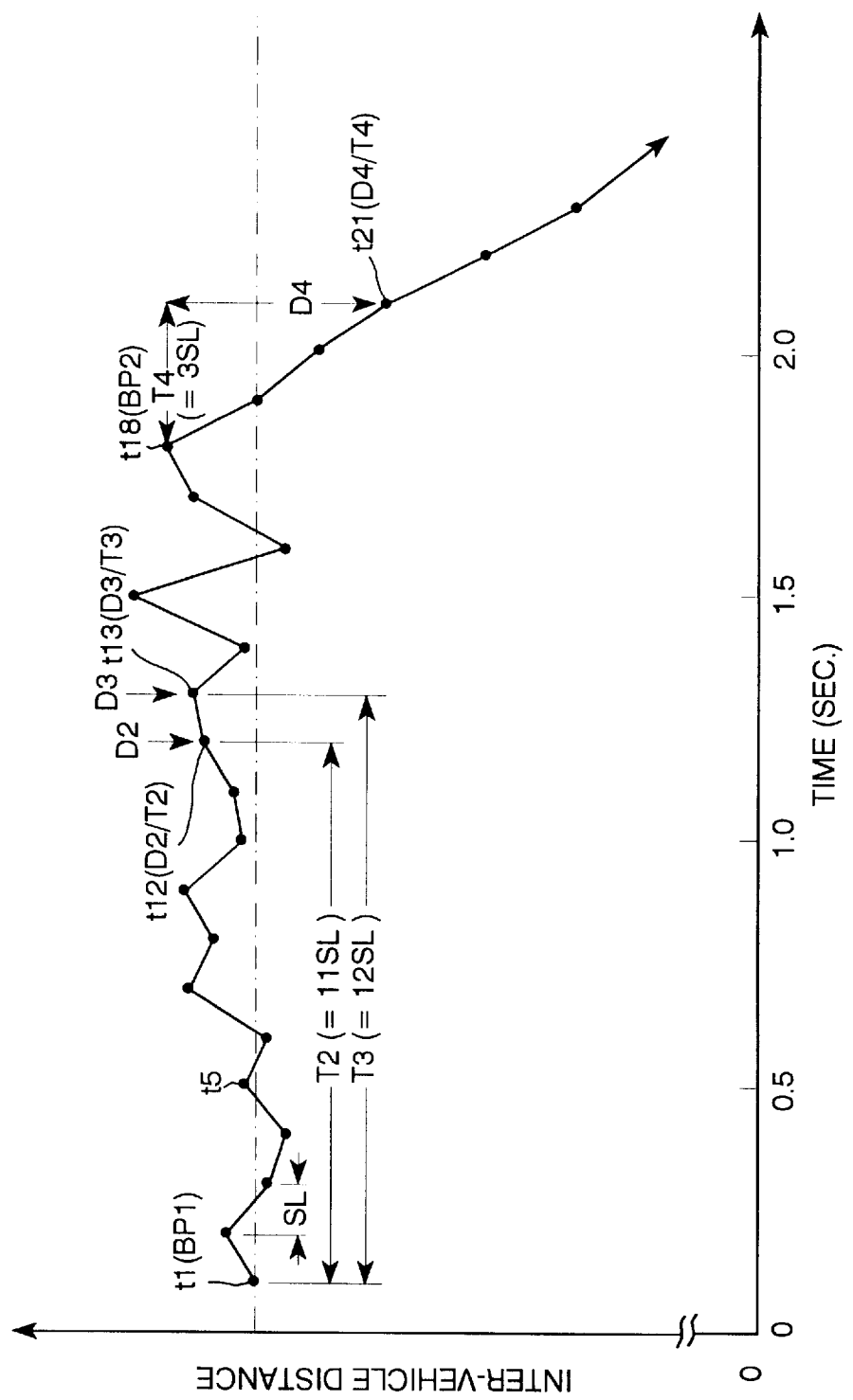
FIG. 7 is a time chart of monitoring an inter-vehicle distance.

The relative speed parameter dcb is differently applied to determinations of the various driving modes at steps Q8, Q9, Q14 and Q15. The following description is directed to when the deceleration mode is determined with reference to the time chart shown in FIG. 7.

The inter-vehicle distance is monitored at regular intervals SL shown in FIG. 5. The system-equipped vehicle 1 starts its following mode driving at a time t1 which is utilized as a reference point establishing a reference inter-vehicle distance shown as a horizontal dotted chain line in FIG. 7. Driving demonstrated in the time chart shown in FIG. 7, the system-equipped vehicle 1 is traveling in the following mode until a time t12. That is, every last three inter-vehicle distance variations do not render the answer to the determination made at step Q5, Q11 or Q12 affirmative until the time t12. In this event, the relative speed between the two vehicles is calculated by dividing a variation D2 between the inter-vehicle distance at the time t12 and the reference inter-vehicle distance at the reference time t1 by a time interval T2 from the time t1 and the time t12. Accordingly, the relative speed of the system-equipped vehicle 1 relative to the preceding vehicle is expressed as D2/T2.

The inter-vehicle distance continuously increases for the last three measurements until a time t13. This increase renders the answer to the determination made at step Q11 affirmative. In this event, the total value of the last three inter-vehicle distance variations to the time t13 is however less than the fixed threshold level of variation dc2. The relative speed at the time t13 is calculated by dividing a variation D3 between the inter-vehicle distance at the time t12 and the reference inter-vehicle distance by a time interval T3 from the time t1 to the time t13 (D3/T3). In this manner, since the reference time from which time intervals are monitored is not changed in the following mode, the relative speed is obtained as stable values.

The inter-vehicle distance continuously decreases for the last three measurements until a time t21. In events where the system-equipped vehicle 1 has caused a variation D4 in inter-vehicle distance from a time t18 to the time t21 greater than the variable threshold level of variation dc1, this decreased variation D4 in inter-vehicle distance renders the answer to the determination made at step Q6 negative, providing a determination of the deceleration mode. In such an event, the reference time for the calculation of relative speed is altered to the time t18 three times of measurements before the time t21. That is, the relative speed is calculated by dividing the decreased variation D4 by a time interval T4 elapsed from the time t18 to the time t21 (D4/T4). As resulting from a continuous decrease in inter-vehicle distance after the time t21, the reference time for the calculation of inter-vehicle distance is progressively shifted to times t19, t20, t21, . . . , in time sequence.

As described above, alteration of the reference time for the relative inter-vehicle speed calculation is executed in events where the inter-vehicle distance changes markedly with the result of determination of the deceleration mode or determination of the acceleration mode and is, however, prevented in events where the inter-vehicle distance does not changes significantly, which provides determination of the following mode.

The following discussion refers to FIGS. 8 through 27 in explaining how the parameters dca through dcj are set up in relation to respective parameters. The determination of the deceleration mode becomes increasingly hard to be made with an increase in the variable threshold level of variation dc1 and various parameters dca through dcg.

Figure 8:
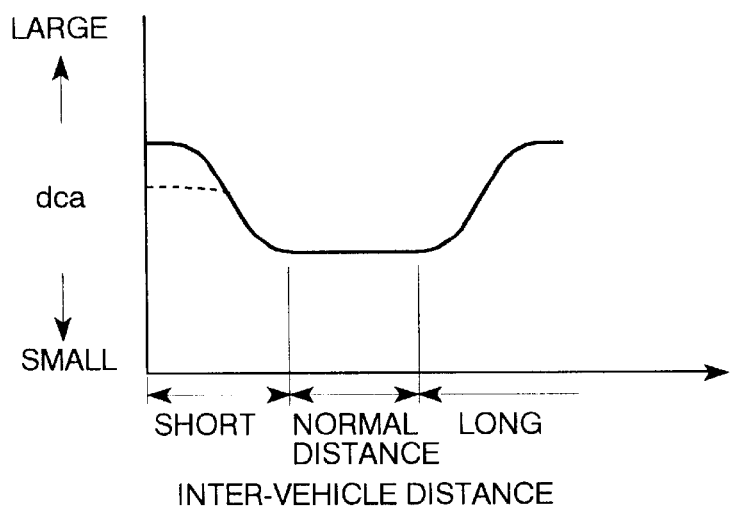
FIG. 8 is a graphical diagram showing a distance parameter dca in relation to inter-vehicle distance.
Figure 9:
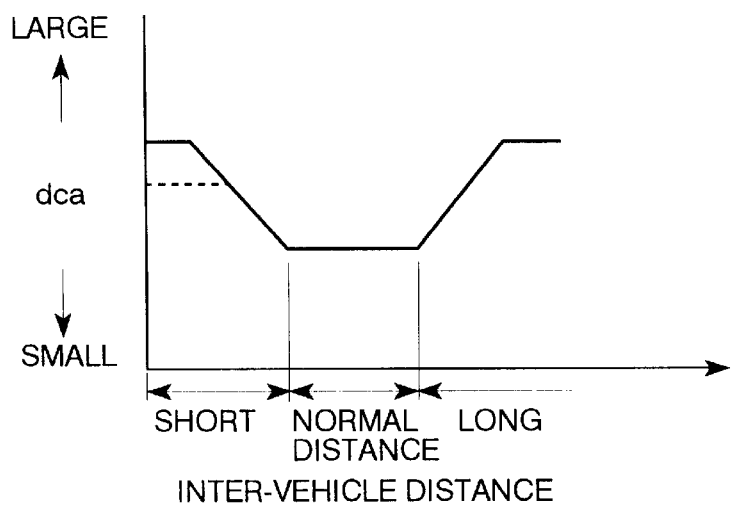
FIG. 9 is another graphical diagram showing a distance parameter dca in relation to inter-vehicle distance.
Figure 10:
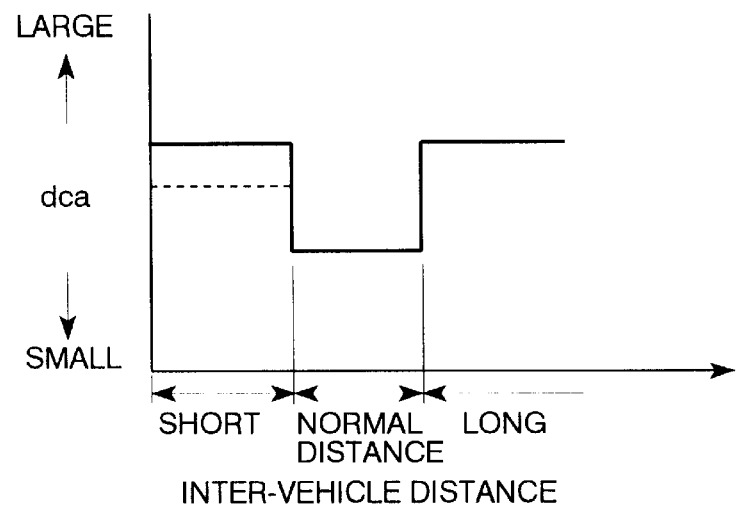
FIG. 10 is still another graphical diagram showing a distance parameter dca in relation to inter-vehicle distance.

FIGS. 8, 9 and 10 show examples of how the distance parameter dca is established in relation to the inter-vehicle distance. As a general rule, because, as the inter-vehicle distance becomes greater, the factor of possible danger such as collisions becomes increasingly smaller and there is a safety margin to evade dangerous approach to the preceding vehicle, the distance parameter dca is established to be at a higher level when the inter-vehicle distance is greater as compared to when that distance is smaller. Further, the distance parameter dca is fixed to a higher level for smaller inter-vehicle distances which the radar 2 can not detect precisely and is beyond a lower limit of a normal inter-vehicle distance range.

As shown in FIG. 8, the distance parameter dca is set at a specific lower level when the inter-vehicle distance lies within the normal inter-vehicle distance range and, however, set at a specific higher level when the inter-vehicle distance becomes greater or smaller than the inter-vehicle distance reference range. Resultingly, the distance parameter dca changes gradually but non-linearly between the greater and lower level settings. As shown by a broken line in FIG. 8, the distance parameter dca may be set at a specific lower level when the inter-vehicle distance becomes smaller than the normal inter-vehicle distance range as compared to when the inter-vehicle distance is greater than that range.

As shown in FIG. 9, the distance parameter dca may gradually changes linearly between the specific higher and lower settings linearly. As indicated by a broken line in FIG. 9, the distance parameter dca may be set at a specific lower level when the inter-vehicle distance becomes smaller than the normal inter-vehicle distance range as compared to when the inter-vehicle distance is greater than that range.

FIG. 10 shows a case in which the distance parameter dca is changed stepwise between the specific higher and lower levels. The distance parameter dca may be set at a specific lower level when the inter-vehicle distance becomes smaller than the normal inter-vehicle distance range as compared to when the inter-vehicle distance is greater than that range as shown by a broken line in FIG. 10.

Figure 11:
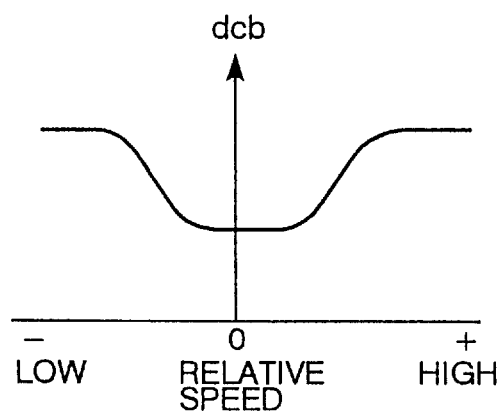
FIG. 11 is a graphical diagram showing a relative speed parameter dcb in relation to relative speed.
Figure 12:
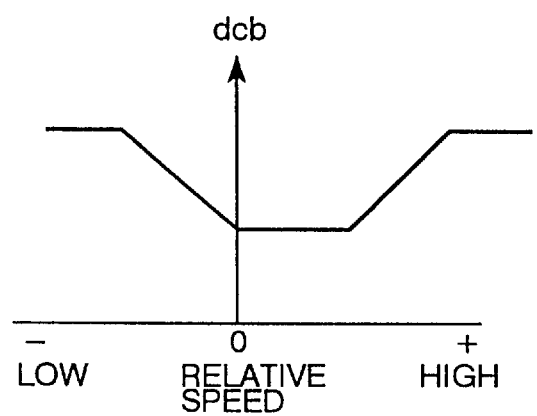
FIG. 12 is another graphical diagram showing a relative speed parameter dcb in relation to relative speed between the system-equipped vehicle and a preceding vehicle ahead of the system-equipped vehicle.
Figure 13:
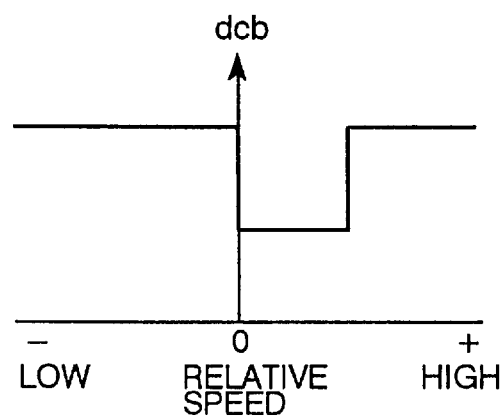
FIG. 13 is still another graphical diagram showing a relative speed parameter dcb in relation to relative speed.

FIGS. 11 through 13 show examples of how the relative speed parameter dcb is set. As a general rule, the relative speed parameter dcb is set at a specific lower level when the relative speed between the two vehicles is near 0 (zero), and is, however, set at a specific higher level when the relative speed between the two vehicles increasingly or decreasingly changes from 0 (zero). Changes in the relative speed parameter dcb between the specific lower and higher levels in FIGS. 11, 12 and 13 occur in the same manner as shown in FIGS. 8, 9 and 10, respectively.

As shown in FIG. 11, the intermediate relative speed Si of a relative speed range for which the relative speed parameter dcb is set at a lower level is offset toward higher relative speeds at which the system-equipped vehicle 1 approaches the preceding vehicle more easily than at a relative speed of 0 (zero). The intermediate relative speed Si of the relative speed range for the lower level of relative speed parameter dcb is offset toward more higher relative speeds in FIG. 12 than in FIG. 11. In FIG. 13, the relative speed parameter dcb is changed stepwise between the specific higher and lower levels at a relative speed of 0 (zero).

Figure 14:
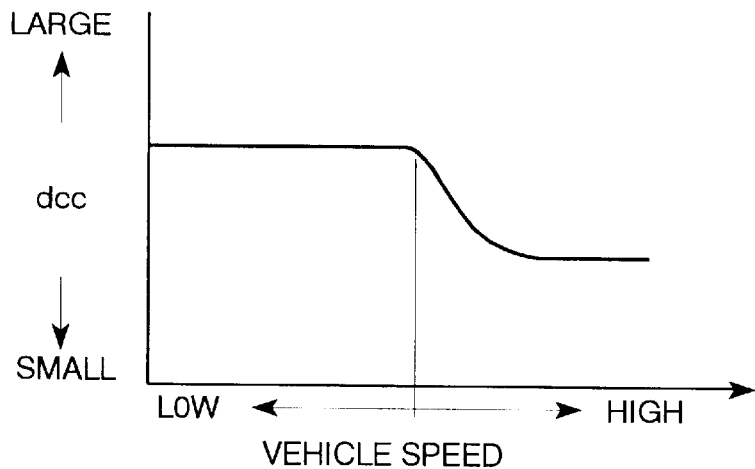
FIG. 14 is a graphical diagram showing vehicle speed parameter dcc in relation to speed of the system-equipped vehicle.
Figure 15:
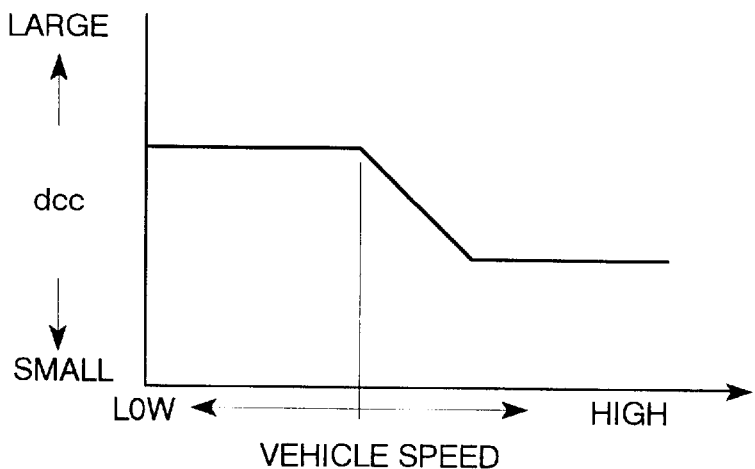
FIG. 15 is another graphical diagram showing vehicle speed parameter dcc in relation to speed of the system-equipped vehicle.
Figure 16:
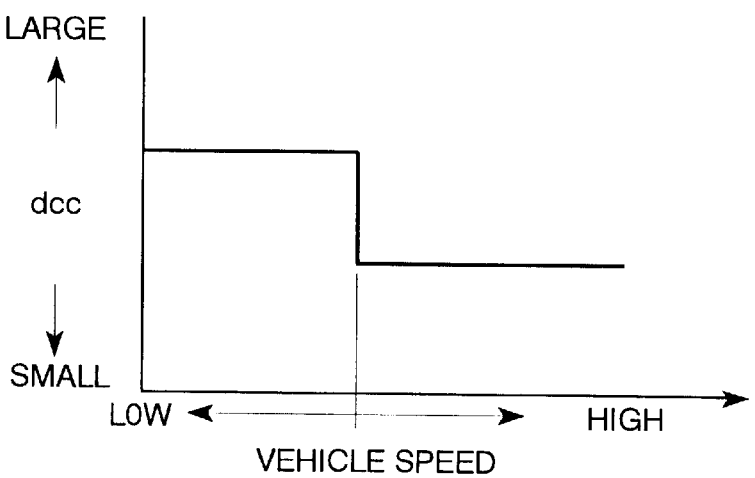
FIG. 16 is still another graphical diagram showing vehicle speed parameter dcc in relation to speed of the system-equipped vehicle.

FIGS. 14 to 16 show examples of how the vehicle speed parameter dcc is set. As a general rule, the vehicle speed parameter dcc is set at a lower level when the vehicle speed is high as compared to when it is low. In FIGS. 14 through 16, the vehicle speed parameter dcc is set at a specific higher level for lower vehicle speeds, and at a specific lower level for higher vehicle speeds. The change in the vehicle speed parameter dcc between the specific higher and lower levels occurs gradually but non-linear in FIG. 14, gradually in a linear fashion in FIG. 15, and stepwise in FIG. 16.

Figure 17:
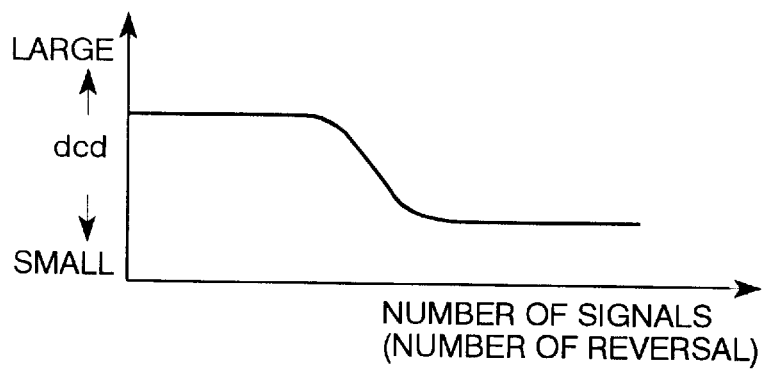
FIG. 17 is a graphical diagram showing traffic congestion parameter dcd in relation to traffic congestion or crowdedness of a road on which the system-equipped vehicle is traveling.

FIG. 17 shows an example of how the traffic congestion parameter dcd is set. The traffic congestion is defined by the number of vehicles in the field of detection of the radar 2. As a general rule, the traffic congestion parameter dcd is set at a lower level when there is a large number of vehicles in front of the system-equipped vehicle 1 as compared to when there is a smaller number of vehicles in front of the system-equipped vehicle 1. More specifically, the traffic congestion parameter dcd is set at a specific higher level when the radar 2 detects a smaller number of vehicles in the field of detection, and at a specific lower level when it detects a larger number of vehicles. The change in the traffic congestion parameter dcd between the specific higher and lower levels occurs gradually but non-linear in FIG. 17. The radar 2 emits a radar signal covering the field of detection at the regular intervals SL and receives reflected signals from vehicles in the field of detection at different times which represent inter-vehicle distances from preceding vehicles. The number of signals received by the radar 2 in each interval SL represents the number of vehicles in the field of detection. Alternatively, a camera can be used to monitor a specified field in front of the system-equipped vehicle 1 and process an image to count the number of vehicles in the front field in a well known manner.

Figure 18:
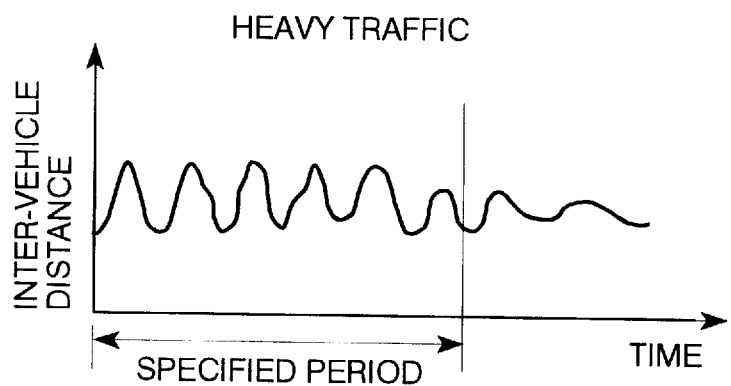
FIG. 18 is a graphical diagram showing fluctuations of inter-vehicle distance when there is heavy traffic on a road on which the system-equipped vehicle is traveling.
Figure 19:
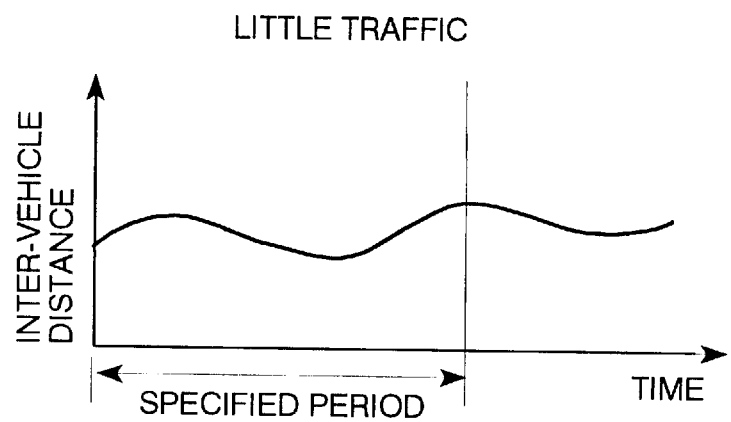
FIG. 19 is a graphical diagram showing fluctuations of inter-vehicle distance when there is little traffic on a road on which the system-equipped vehicle is traveling.

The extent of traffic congestion may be determined based on the fact that fluctuations in inter-vehicle distance occur more frequently when there is heavy traffic on a road than when there is little traffic on the road. The inter-vehicle distance L(i) from a nearest preceding vehicle is detected at the regular intervals SL and is compared to the previous inter-vehicle distance to determine whether the current inter-vehicle distance has increased or decreased from the previous inter-vehicle distance L(i-1). It is determined that there is heavy traffic when the number of times of reversal of changes from increase to decrease and/or vise versa in the inter-vehicle distance included within the results of the determination obtained during a specific period of time is greater as shown in FIG. 18, or little traffic when it is small as shown in FIG. 19.

The traffic congestion parameter dcd is, in general, set at a level lower when the number of times of reversal of changes in inter-vehicle distance is great than when it is smaller as shown in FIG. 17.

Further, the extent of traffic congestion may be determined based on the fact that fluctuations in acceleration in a direction of traveling (which is referred to as longitudinal acceleration G) occur more frequently when there is heavy traffic on a road than when there is little traffic on the road. The vehicle speed is detected at the regular intervals SL and is differentiated to obtain the longitudinal acceleration G(i). This current longitudinal G(i) acceleration is compared to the previous longitudinal acceleration G(i-1) to determine whether the longitudinal acceleration has increased or decreased from the previous one. It is determined that there is heavy traffic when the number of times of reversal of changes from increase to decrease and/or vise versa in the longitudinal acceleration G included within the results of the determination obtained during the specific period of time is greater, or little traffic when it is small.

Figure 20:
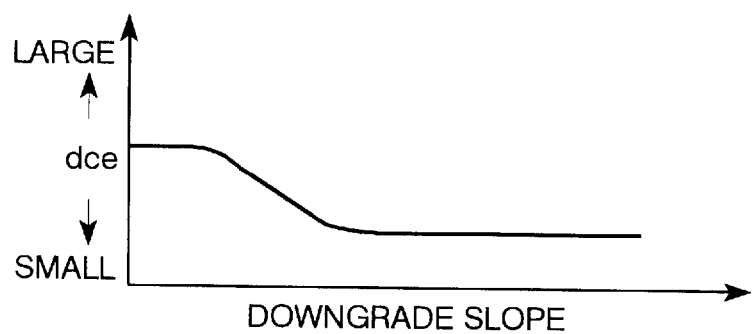
FIG. 20 is a graphical diagram showing a slope parameter dce in relation to a slope angle of a downgrade on which the system-equipped vehicle is traveling.

FIG. 20 shows an example of how the slope parameter dce is set. The slope parameter dce is basically established as a lower level when the slope of downgrade is larger as compared to when it is smaller. More specifically, the slope parameter dce, is set at a specific high level for smaller downward slopes, and at a specific low level for larger downward slopes, and is altered between the specific high and low levels; with an increase in downward slope. The slope of downgrade is detected by a slope angle sensor or a clinometer as one of the group of sensors SG. Alternatively, the slope of downgrade may be calculated in a well known manner based on a theoretical vehicle speed on a flat road, which is determined from throttle opening, engine speed of rotation and transmission gear ratio, and an actual vehicle speed.

Figure 21:
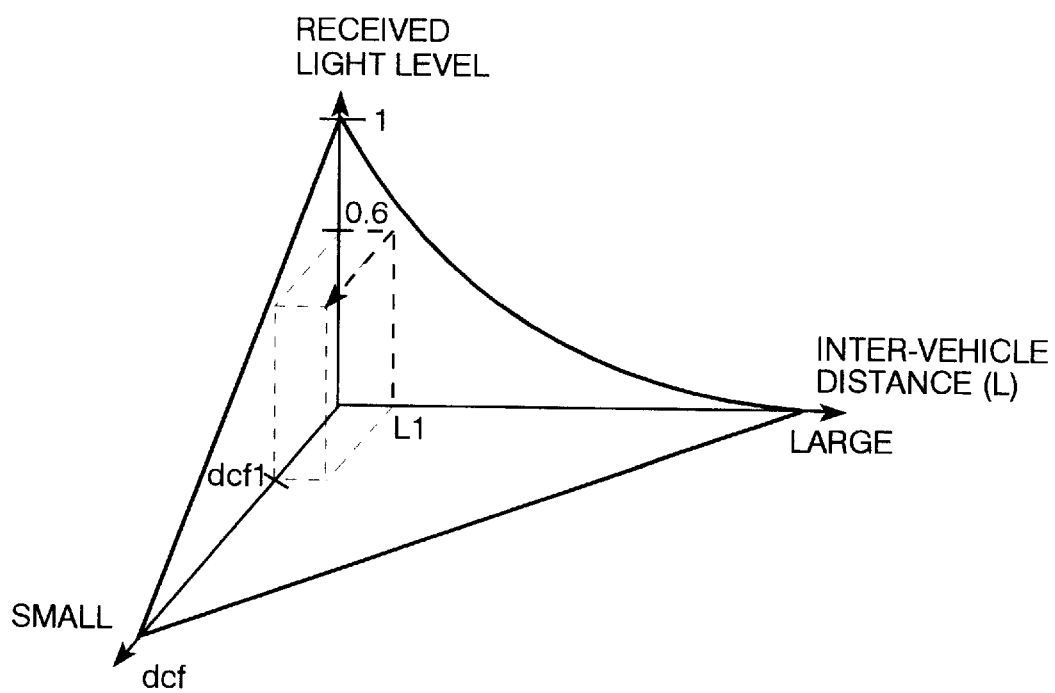
FIG. 21 is a graphical diagram showing visibility parameter dcf in relation to visibility of a forward visual field.

FIG. 21 shows an example of how the visibility parameter dcf is set. The visibility is generally defined as a factor varying according to the level of received light by the radar 2 and the inter-vehicle distance. The level of received light by the radar 2 is in inversely proportional to the fourth power of inter-vehicle distance and in proportion to the light transmission ratio squared. As shown in FIG. 21, the visibility parameter dcf is set at a lower level when the level of received light by the radar 2 and/or the inter-vehicle distance are large as compared to when the level of received light by the radar 2 and/or the inter-vehicle distance are small.

The visibility may be otherwise monitored based on whether the windshield wipers is operating and/or whether the headlights are on. This is based on the fact that the windshield wipers and/or the headlights are used in a rain or in a fog which provides a poor visibility. A specific lower level of visibility parameter dcf is set for poor visibility.

Figure 22:
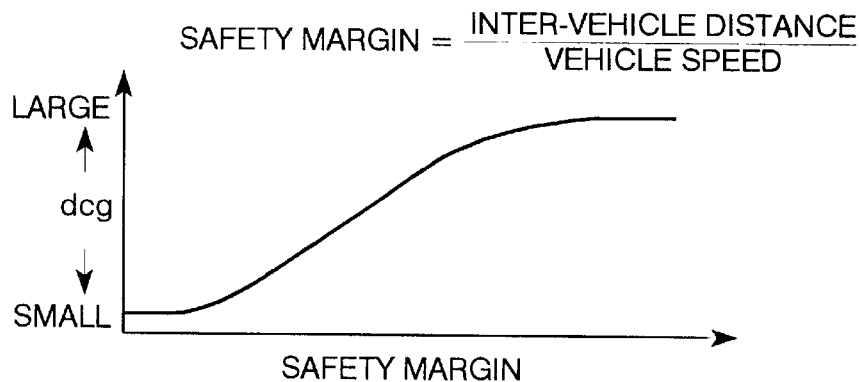
FIG. 22 is a graphical diagram showing safety margin parameter dcg in relation to safety against a previous vehicle

FIG. 22 shows an example of how the safety margin parameter dcg is established in relation to the safety margin against the preceding vehicle. The safety margin is established as a parameter of inter-vehicle distance and vehicle speed of the system-equipped vehicle 1 and is defined by inter-vehicle distance divided by vehicle speed. The safety margin parameter dcg is set at a larger level when the safety margin is larger as compared to when it is smaller. More specifically, the safety margin parameter dcg is set at a specific smaller level when the safety margin is smaller, and at a specific larger level when it is larger, and varied between these two specific settings for intermediate safety margins.

Safety margin set as a parameter of inter-vehicle distance and vehicle speed well corresponds to actual vehicle driving conditions. In other words, the driver feels correspondingly less apprehension as the inter-vehicle distance increases and as the system-equipped vehicle 1 decreases its speed. Inter-vehicle distance and speed are the most crucial factors among those that affect the safety operation of the system-equipped vehicle 1, Accordingly, of all the weighing coefficients ka through kj utilized to weight the respective parameters dca through dcj, the weighing coefficient kg is set to have the largest value.

Figure 23:
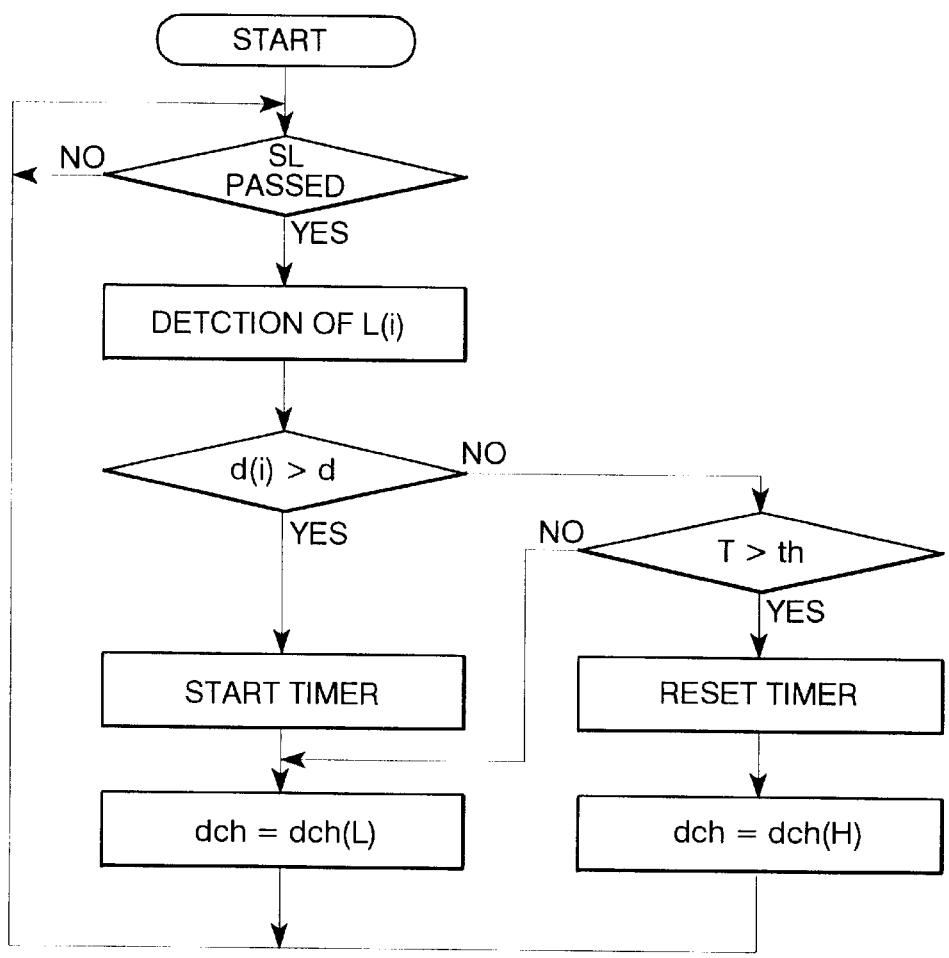
FIG. 23 is a flow chart illustrating a sequence routing of establishing inroad parameter dch in relation to vehicles inroads into a line between the system-equipped vehicle and a preceding vehicle directly ahead of the system-equipped vehicle.

Inroads of vehicles into a line between to the system-equipped vehicle 1 and a preceding vehicle which is directly followed by the system-equipped vehicle 1 is detected based on the fact that a significantly great change in inter-vehicle distance is suddenly changed. The inroad parameter dch is set at a low level when a significantly great change in inter-vehicle distance occurs in a specific time, for instance five seconds. Specifically, as shown in FIG. 23, when the inter-vehicle variation d(i) between the current inter-vehicle distance L(i) and the previous inter-vehicle distance L(i-1) is greater than a specific change d, the inroad parameter dch is set at a specific low level dch(L) following starting a timer. On the other hand, when the inter-vehicle variation d(i) is less than a specific change d and the timer has counted a specific time th (for instance 5 seconds), the inroad parameter dch is set at a specific high level dch(L) following resetting the timer.

Figure 24:
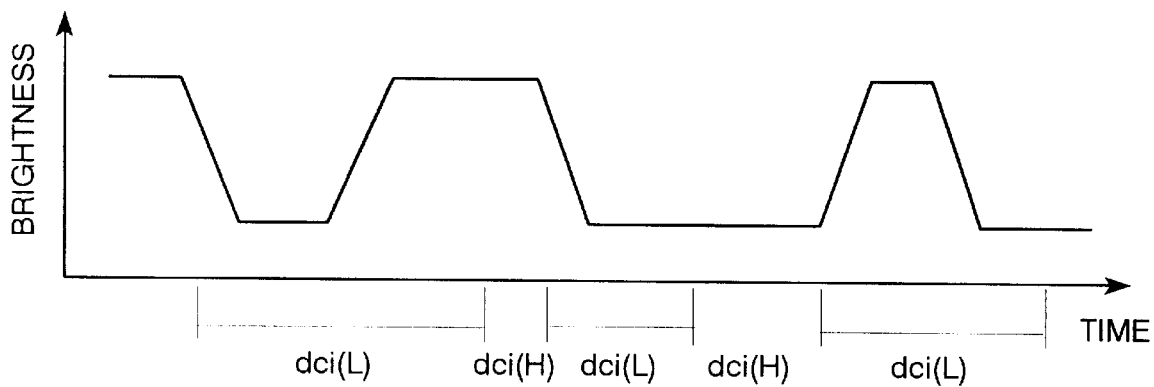
FIG. 24 is a graphical diagram showing brightness parameter dci in relation to ambient brightness.
Figure 25:
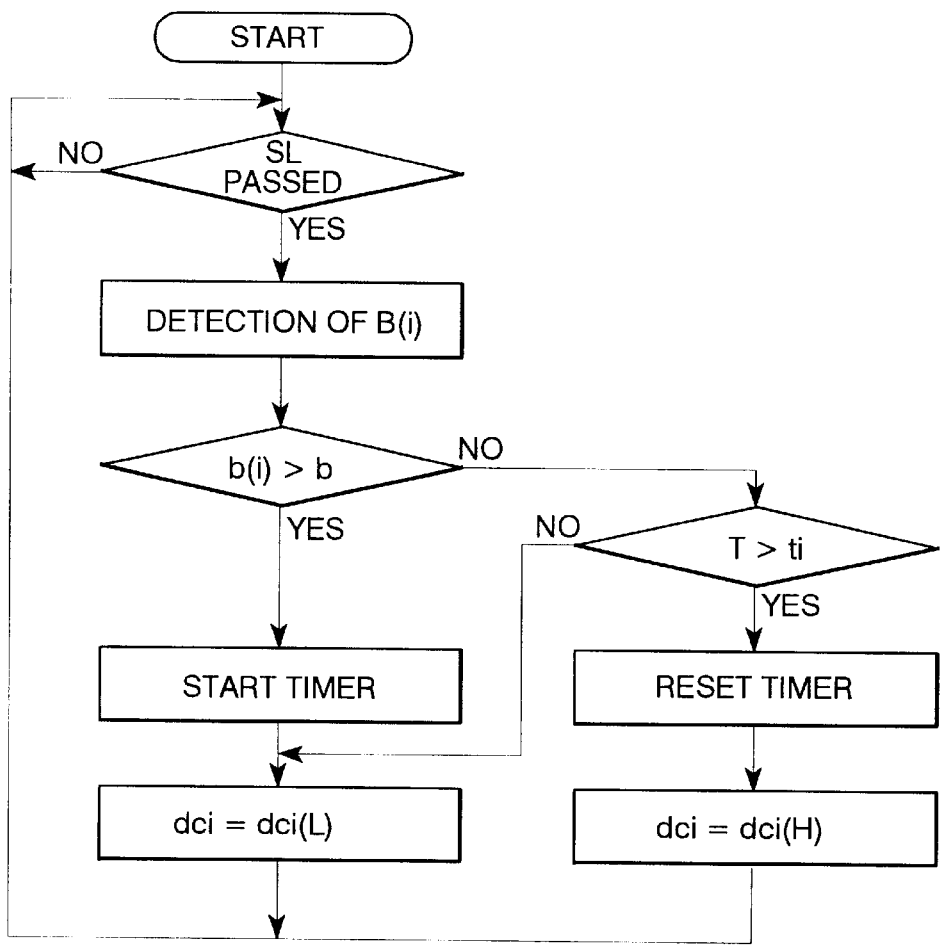
FIG. 25 is a flow chart illustrating a sequence routing of establishing brightness parameter dci in relation to ambient brightness.

When the system-equipped vehicle 1 is suddenly put in dark surroundings, the driver takes a time to have the driver's eyes inured to the dark surroundings. For this reason, the brightness parameter dci is set at a low level when a significantly great change in ambient brightness occurs in a specific time as shown in FIG. 24. Specifically, as shown in FIG. 25, ambient brightness B(i) is detected by an ambient light sensor as one of the group of sensors SG at regular intervals. When the ambient brightness variation b(i) between the current ambient brightness B(i) and the previous ambient brightness B(i-1) is greater than a specific variation b, the brightness parameter dci is set at a specific low level dci(L) following starting a timer. On the other hand, when the ambient brightness variation b(i) is less than the specific change b and the timer has counted a specific time t1 the brightness parameter dci is set at a specific high level dci(L) following resetting the timer.

Figure 26:
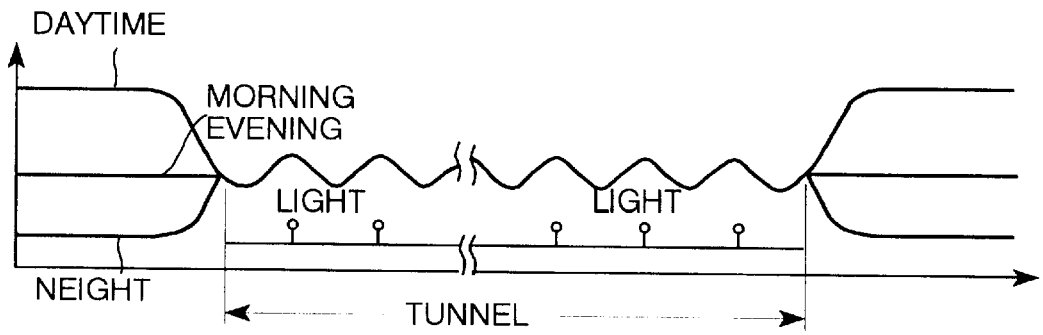
FIG. 26 is a graphical diagram showing change in brightness while the system-equipped vehicle is traveling in a tunnel.
Figure 27:
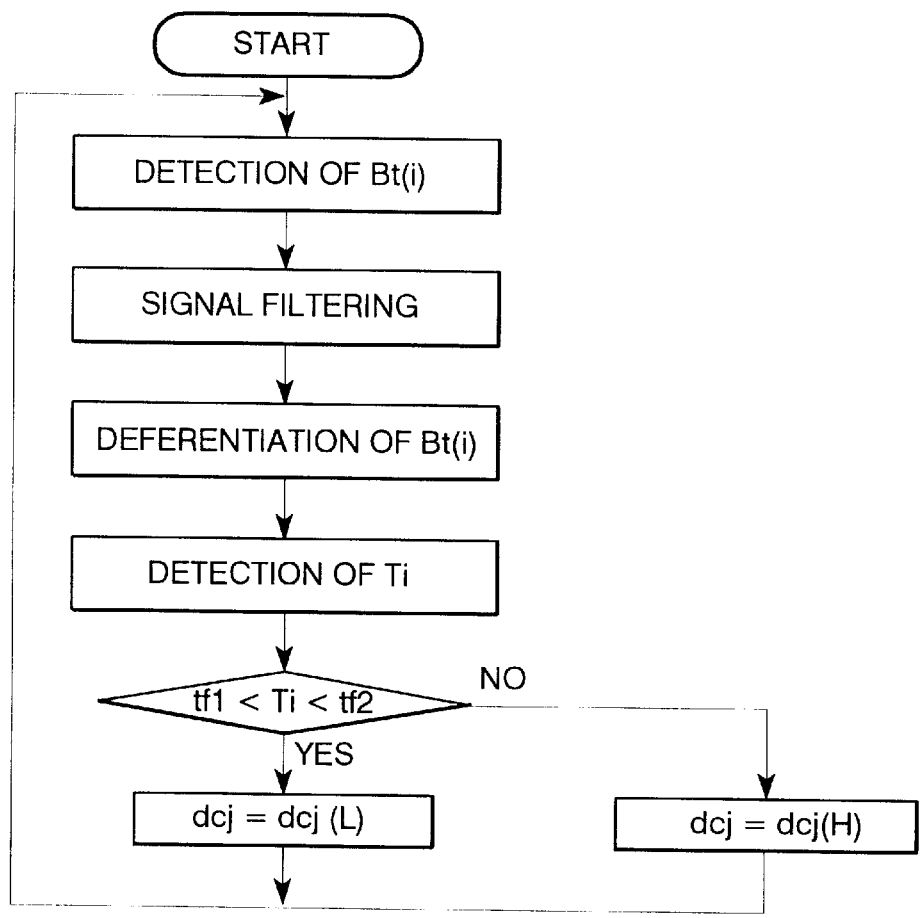
FIG. 27 is a flow chart illustrating a sequence routing of establishing tunnel parameter dcj in relation to ambient brightness.

The potential for an occurrence of a rear-end collision is increased during traveling through a tunnel especially at the daytime due to an extreme and sudden change from bright and open surroundings to dark and closed surroundings which the driver must cope with. Accordingly, the tunnel parameter dc1 is set at a smaller level when the system-equipped vehicle 1 is passing through a tunnel, especially when passing through a tunnel in the daylight hours, as compared to when passing through a tunnel early in the morning, or in the evening or a night. Because there are a number of illumination lamps arranged at regular intervals in a tunnel, the system-equipped vehicle 1 experiences a periodic change in ambient brightness while it is passing through a tunnel. The periodic change in ambient brightness may be monitored based on a periodic change in output from the ambient light sensor as shown in FIG. 26. Although the periodic change in ambient brightness occurs even while the system-equipped vehicle 1 is traveling on a highway with illumination lamps arranged at regular intervals, the frequency of changes in ambient brightness the system-equipped vehicle 1 experiences is generally higher during traveling on highways than passing in tunnels. Accordingly, it is easily recognized by monitoring a specific frequency of changes in ambient brightness whether the system-equipped vehicle 1 is traveling on a highway or passing through a tunnel. Specifically, as shown in FIG. 27, after having removed high frequency components as noises by passing an output representative of ambient brightness B(i) from the ambient light sensor through a low-pass filter, the output is differentiated to detect an interval Ti between adjacent points of inflection from minus to plus or vice versa. When the interval Ti is between specific times tf1 and tf2, this indicates that the system-equipped vehicle 1 is traveling in a tunnel, then, the tunnel parameter dcj is set at a specific low level dcj(L), On the other hand, when the interval Ti is beyond both the specific times tf1 and tf2, this indicates that the system-equipped vehicle 1 is traveling out of a tunnel, then, the tunnel parameter dcj is set at a specific high level dcj(H).

Various maps of the parameters have been stored in a read only memory (ROM) integrated into the control unit U.

In addition to the embodiments described above, the invention also encompasses various variations. The reference time for the calculation of relative speed may be altered at each and every detection of inter-vehicle distance. The fixed threshold level of variation dc2 for making determination of the existence of acceleration of the preceding vehicle may be altered according to any appropriate parameters.

In cases where the variable threshold level of variation dc1 for making determination of the existence of deceleration of the preceding vehicle is altered according to various parameters, a reference threshold level may be first set according, for example, to the safety margin parameter dcg, and, then, multiplied by a correction coefficient determined based on other parameters, such as the distance parameter dca and the relative speed parameter dcb, to obtain the variable threshold level of variation dc1. Furthermore, the variable threshold level of variation dc1 may also be established as a small value at which the warning device 4 is activated, and a large value at which the automatic braking device 5 is activated.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A preceding vehicle monitoring system for monitoring driving conditions of a preceding vehicle directly in front of a vehicle, said preceding vehicle monitoring system comprising:

distance monitoring means for monitoring an inter-vehicle distance to a preceding vehicle at regular intervals; and driving condition determining means for calculating a change in inter-vehicle distance between every adjacent intervals based on said inter-vehicle distances, detecting predetermined times of consecutive decreases in said change in inter-vehicle distance, detecting a total of said predetermined times of consecutive decreases and determining that said preceding vehicle is in deceleration when said total of said predetermined times of consecutive decreases is greater than a specified threshold decrease in distance.

2. The preceding vehicle monitoring system as defined in claim 1, wherein said driving condition determined means alters said specified threshold decrease in distance according to dangerous situations of said vehicle.

3. The preceding vehicle monitoring system as defined in claim 2, wherein said dangerous situations include a relative driving condition of the vehicle to said preceding vehicle.

4. The preceding vehicle monitoring system as defined in claim 3, wherein said driving condition determining means alters said specified threshold decrease in distance to a greater value when an inter-vehicle distance of the vehicle to a preceding vehicle monitored as said relative driving condition by said distance monitoring means is greater as compared to when said inter-vehicle distance is smaller.

5. The preceding vehicle monitoring system as defined in claim 4, wherein said driving condition determining means detects a relative speed of the vehicle to said preceding vehicle as said relative driving condition based on said variation in said inter-vehicle distance and alters said specified threshold decrease in distance to a greater value when said relative speed is greater as compared to when said relative speed is smaller.

6. The preceding vehicle monitoring system as defined in claim 2, wherein said dangerous situations include a driving condition of the vehicle.

7. The preceding vehicle monitoring system as defined in claim 6, further comprising a speed monitoring means for monitoring a speed of the vehicle as said driving condition, wherein said driving condition determining means alters said specified threshold decrease in distance to a smaller value when a speed of the vehicle detected by said speed monitoring means is greater as compared to when said speed is smaller.

8. The preceding vehicle monitoring system as defined in claim 2, wherein said driving condition determining means monitors said safety margin as a factor of said dangerous situations which is defined by an inter-vehicle distance divided by a speed of the vehicle and alters said specified threshold decrease in distance to a smaller value when said safety margin is smaller as compared to when it is larger.

9. The preceding vehicle monitoring system as defined in claim 2, wherein said distance monitoring means is of a type emitting a signal wave toward a preceding vehicle at specific time intervals and receiving a signal wave reflected by the preceding vehicle to detect an inter-vehicle distance to the preceding vehicle based on a elapsed time taken for said signal wave to return from the preceding vehicle.

10. The preceding vehicle monitoring system as defined in claim 9, wherein said driving condition determining means monitors a level of said signal wave received by said distance monitoring means and alters said specified threshold decrease in distance to a greater value when said level of said signal waves is higher as compared to when said level of said signal waves is lower.

11. The preceding vehicle monitoring system as defined in claim 10, wherein said driving condition determining means alters said specified threshold decrease in distance to a greater value when said inter-vehicle distance is larger as compared to when said inter-vehicle distance is smaller.

12. The preceding vehicle monitoring system as defined in claim 2, wherein said specified reference value consists of a plurality of variable parameters defined in relation respectively to dangerous situations of said vehicle added together.

13. The preceding vehicle monitoring system as defined in claim 12, wherein said parameters are individually weighted.

14. The preceding vehicle monitoring system as defined in claim 2, wherein said specified threshold decrease in distance is altered by multiplying a reference parameter determined in relation to at least one specific dangerous situation of said vehicle by parameters in relation to dangerous situations of said vehicle excluding said specific dangerous situation.

15. The preceding vehicle monitoring system as defined in claim 2, wherein said dangerous situations include external surroundings of the vehicle.

16. The preceding vehicle monitoring system as defined in claim 15, wherein said driving condition determining means detects the number of times of reversal of changes in said inter-vehicle distance between increase and decrease as said external surroundings and alters said specified threshold decrease in distance to a smaller value when said number of times of reversal in a specific period of time is greater as compared to when said number of times of reversal in said specific period of time is small.

17. The preceding vehicle monitoring system as defined in claim 15, wherein said driving condition determining means detects a specific reduction in said inter-vehicle distance as said external surroundings and alters said specified threshold decrease in distance to a smaller value when detecting said specific reduction.

18. The preceding vehicle monitoring system as defined in claim 15, and further comprising brightness monitoring means for monitoring an ambient brightness around the vehicle, wherein said driving condition determining means detects a change in said ambient brightness as said external surroundings and alters said specified threshold decrease in distance to a smaller value when detecting a specific level of said change in a specified period of time.

19. The preceding vehicle monitoring system as defined in claim 15, and further comprising brightness monitoring means for monitoring an ambient brightness around the vehicle, wherein said driving condition determining means detects a change in said ambient brightness as said external surroundings and alters said specified threshold decrease in distance to a smaller value when detecting said change at a specified frequency.

20. The preceding vehicle monitoring system as defined in claim 15, and further comprising slope monitoring means for monitoring a slope angle of a downgrade on which the vehicle is driving as said external surroundings, wherein said driving condition determining means alters said specified threshold decrease in distance to a smaller value when said slope angle is greater than a specific angle.

21. The preceding vehicle monitoring system as defined in claim 1, wherein said vehicle is equipped with automatic cruising means for causing said vehicle to follow said preceding vehicle at a specified inter-vehicle distance.

22. A preceding vehicle monitoring system for monitoring driving conditions of a preceding vehicle directly in front of a vehicle, said preceding vehicle monitoring system comprising:

a distance sensor for detecting an inter-vehicle distance to a preceding vehicle at regular intervals; and a driving condition determining unit for calculating a change in inter-vehicle distance between every adjacent intervals based on said inter-vehicle distances, detecting a predetermined times of consecutive decreases in said change in inter-vehicle distance, detecting a total of said predetermined times of consecutive decreases, and determining that said preceding vehicle is in deceleration when said total of said predetermined times of consecutive decreases is greater than a specified threshold decrease in distance.

23. The preceding vehicle monitoring system as defined in claim 22, wherein said vehicle is equipped with automatic cruising control means for causing said vehicle to follow said preceding vehicle at a specified inter-vehicle distance.

24. A preceding vehicle monitoring system for monitoring driving conditions of a preceding vehicle directly in front of a vehicle, said preceding vehicle monitoring system comprising:

distance monitoring means for monitoring an inter-vehicle distance to a preceding vehicle at regular intervals; and driving condition determining means for calculating a change in inter-vehicle distance between every adjacent intervals based on said inter-vehicle distances, detecting a predetermined times of consecutive decreases in said change in inter-vehicle distance, and determining that said preceding vehicle is in deceleration when said predetermined number of times of consecutive decreases are detected.

25. The preceding vehicle monitoring system as defined in claim 24, wherein said vehicle is equipped with automatic cruising means for causing said vehicle to follow said preceding vehicle at a specified distance.

* * * * *